United States Patent [19]

Clegg

[11] Patent Number: 4,577,937

[45] Date of Patent: Mar. 25, 1986

[54] CONICAL BEAM CONCENTRATOR

[76] Inventor: John E. Clegg, 2320 Keystone Dr., Orlando, Fla. 32806

[21] Appl. No.: 656,569

[22] Filed: Oct. 1, 1984

[51] Int. Cl.[4] .............................................. G02B 13/18
[52] U.S. Cl. ..................................... 350/432; 126/440
[58] Field of Search ........................ 350/432; 126/440

[56] References Cited

U.S. PATENT DOCUMENTS

| | | | |
|---|---|---|---|
| 2,881,654 | 4/1959 | Toffolo | 350/432 |
| 2,882,784 | 4/1959 | Toffolo | 350/432 |
| 4,277,148 | 7/1981 | Clegg | 350/432 |
| 4,325,612 | 4/1982 | Clegg | 350/432 |
| 4,333,713 | 6/1982 | Clegg | 350/432 |

Primary Examiner—John K. Corbin
Assistant Examiner—Rebecca D. Gass

[57] ABSTRACT

An upper component lens which receives and refracts a circular whole incipient beam, forming a convergent conical beam; a first middle component lens which refracts the convergent conical beam, forming an annular beam; a second middle component lens which refracts the annular beam, forming a convergent conical beam; and a lower component lens which refracts the convergent conical beam, forming a concentrated whole beam which is emitted parallel to the vertical optic axis of the concentrator.

1 Claim, 2 Drawing Figures

CONICAL BEAM CONCENTRATOR

BACKGROUND

The code designation of the concentrator is 4RT:C (R—refracting section of a component lens, T—transmitting section of a component lens, and C—concentrating stage lens).

Prior art includes the *Conical Split-Image Microscopic Lens,* U.S. Pat. No. 4,277,148, by this inventor. This is a microscopic lens which can be used as a beam concentrator. It has a lower component lens which is similar to the lower component lens of the subject disclosure.

Prior art includes also the *Conical Beam Concentrator,* U.S. Pat. No. 4,333,713, by this inventor. Both the upper and lower component lenses of this concentrator are similar to the same lenses of the subject disclosure.

DRAWINGS

DESCRIPTION

Figure 1:
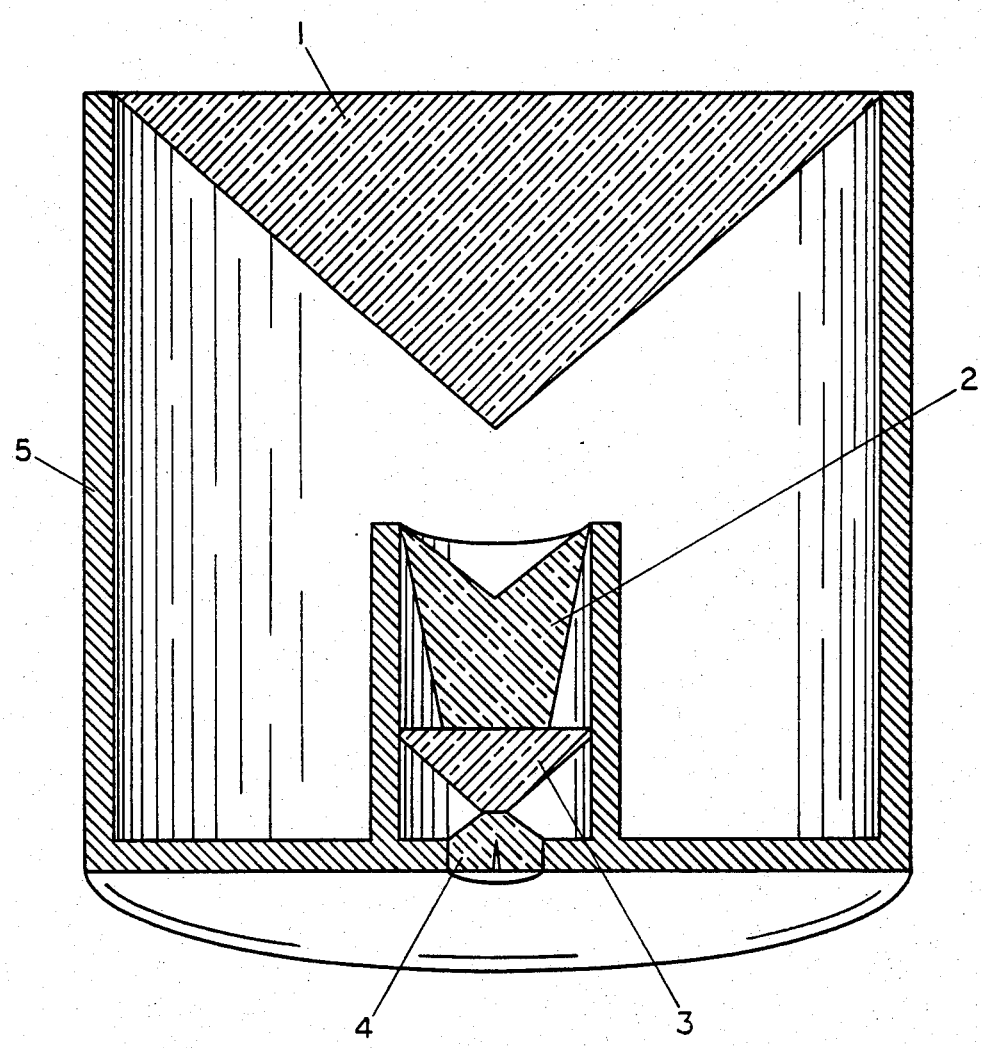
FIG. 1 is an elevation of the conical beam concentrator with the lenses shown in section.

FIG. 1 shows the conical beam concentrator 4RT:C with upper component lens RT 1, first middle component lens RT 2, second middle component lens RT 3 and lower component lens RT 4 mounted inside casing 5.

Figure 2:
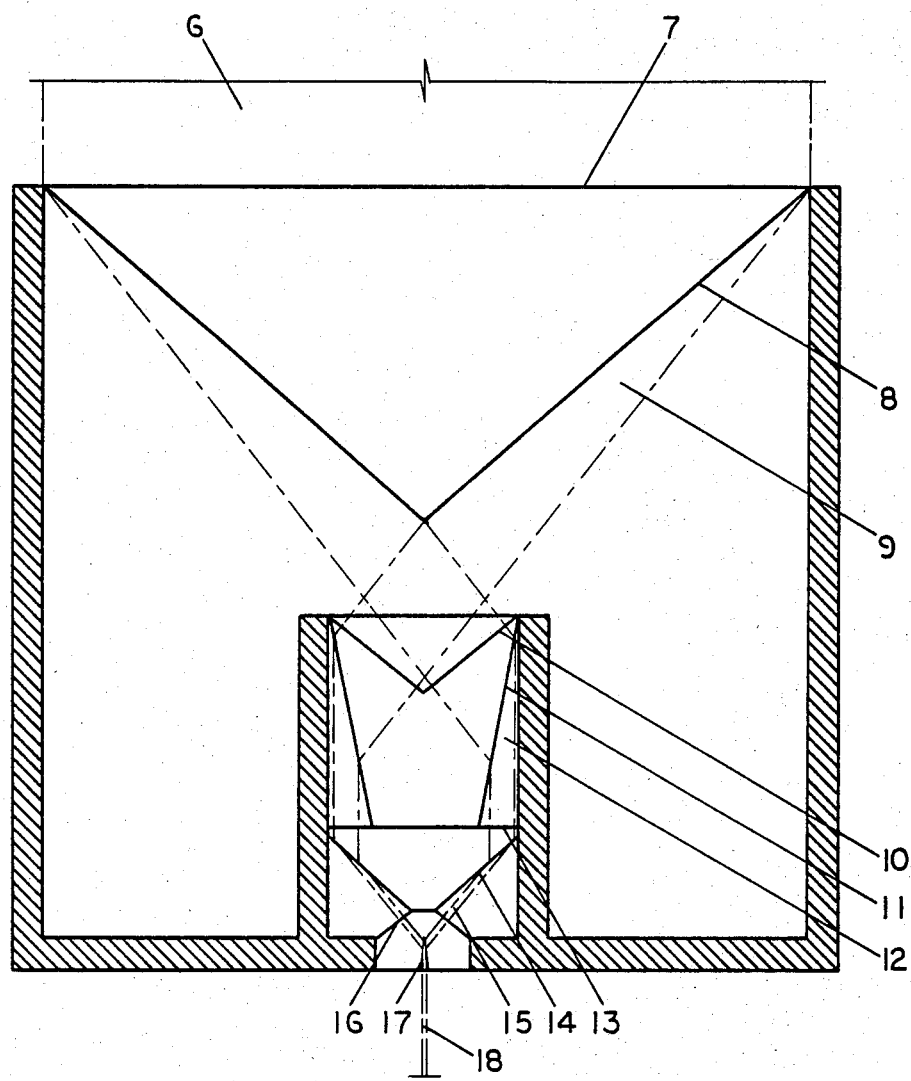
FIG. 2 is an elevation of the concentrator with a ray diagram.

FIG. 2 is an elevation of the concentrator with a ray diagram. Circular whole incipient beam 6 is received and transmitted by planar section 7 and refracted by convex conical section 8, forming convergent conical beam 9.

Beam 9 is transmitted by concave conical section 10 and refracted by convex conical section 11, forming annular beam 12.

Beam 12 is transmitted by planar section 13 and refracted by convex conical section 14, forming convergent conical beam 15.

Beam 15 is transmitted by convex conical section 16 and refracted by concave conical section 17, forming concentrated circular whole beam 18 which is emitted parallel to the vertical optic axis of the concentrator.

I claim:

1. A conical beam concentrator 4RT:C comprising in general four conical component lenses which receive a circular whole incipient beam of direct sunlight and emit a circular whole concentrated beam, and comprising in particular;

an upper component lens RT (1) having a planar section (7) which receives and transmits a circular whole incipient beam (6) of direct sunlight and having a convex conical section (8) which refracts incipient beam (6), forming a convergent conical beam (9), a first middle component lens RT (2) having a concave conical switch (10) which transmits convergent conical beam (9) and having a convex conical section (11) which refracts convergent conical beam (9), forming annular beam (12), a second middle component lens RT (3) having a planar section (13) which transmits annular beam (12) and having a convex conical section (14) which refracts annular beam (12), forming a convergent conical beam (15), and a lower component lens RT (4) having a convex conical section (16) which transmits convergent conical beam (15) and having a concave conical section (17) which refracts convergent conical beam (15), forming a concentrated circular whole beam (18) which is emitted parallel to the vertical optic axis of the lenses.

* * * * *